Nov. 7, 1967   H. GLASTRA   3,350,970

APPARATUS FOR CUTTING SHEET MATERIAL

Filed June 11, 1965   2 Sheets-Sheet 1

United States Patent Office 3,350,970
Patented Nov. 7, 1967

3,350,970
APPARATUS FOR CUTTING SHEET MATERIAL
Hendrik Glastra, Enschede, Netherlands, assignor to N.V. Maatschappij voor Industriële Research en Ontwikkeling, Enschede, Netherlands, a corporation of the Netherlands
Filed June 11, 1965, Ser. No. 463,113
Claims priority, application Netherlands, June 17, 1964, 64—6,916
7 Claims. (Cl. 83—201.07)

ABSTRACT OF THE DISCLOSURE

Apparatus for cutting sheet material supported on an elongated flexible platform. A frame slidable longitudinally of the platform has affixed thereto a set of parallel deflecting elements extending across the platform in close proximity to each other and thereby turning the flexible platform material downwardly to form a narrow recess extending across the platform, the recess being movable longitudinally with respect to the platform as the frame is moved longitudinally. The frame also includes an endless cutter element mounted on guide wheels connected to the frame and located above the platform and below the platform in the recess, the guide wheels mounted on slides and movable transversely across the platform to move the cutter element transversely across the platform as the wire is moved along its own axis to perform the cutting action and independently of the longitudinal movement of the frame.

The present invention relates to an apparatus for cutting sheet material, especially the cutting of the constituent parts of articles of dress and the like from textile or such like flexible material, the said apparatus comprising a platform for supporting the material to be cut and a cutting element which is perpendicular to the supporting surface and which can be moved in longitudinal direction.

In the conventional apparatus, the material to be cut is pushed and turned across the platform, in order to enable the cutting element, which is provided in a fixed place and which passes through an aperture in the platform, to cut through the material along the lines and curves desired.

In order that all the parts of the material to be cut may be reached by the cutting element, the platform should be many times larger than the material to be cut. This fact is felt to be a great drawback, particularly in the clothing industry, where large numbers of such apparatus are used, because the space required is an important constituent factor of the cost price. In addition to this, the known apparatus are not suitable for automation.

It is the object of the present invention to provide a cutting apparatus which will overcome the drawbacks referred to.

To this end the apparatus according to this invention is characterized in that the platform is formed by a flexible band, which is guided over two mutually parallel deflection elements, which are mounted close to one another on either side of the cutting element and over at least one deflection element mounted thereunder, the said deflection elements being carried by a frame which can be moved perpendicularly to the longitudinal direction of the deflection elements, which frame also carries the cutting element and the means by which this is moved.

In a cutting apparatus which is appointed as described, the platform is, at the location of the cutting element, provided with a slit which can shift simultaneously with the cutting element with respect to the supporting surface of the platform and to the material to be cut, which latter remains in its place.

In order to extend the movability of the cutting element, a cutting element according to this invention is further characterized in that the cutting element is carried by slides mounted movably over and under the platform, which two slides can be simultaneously subjected to like shifts parallel to the deflection elements by means of two conveying mechanisms, which are connected to each other.

In this apparatus, the cutting element can be shifted in two directions, which are perpendicular to one another, i.e. in the one direction through the movability of the frame, and in the other direction through the movability of the slides with respect to the frame. This enables the cutting element to work the material to be cut along any desired line or curve, without any need for the material to be shifted.

As compared with conventional cutting apparatus, the apparatus according to the present invention constitutes an important saving of room, as the supporting surface need not be larger than the material to be cut. In addition to this, because the material to be cut does not require to be shifted or turned, the operation of the apparatus according to the invention is much simpler and less tiring, whereas it can also be operated in a quicker tempo.

An important result of this invention is that it opens up the possibility for instance, of automatizing the cutting of patterns in the clothing industry, a possibility which is absent in the known cutting apparatus. In order to achieve this, the apparatus according to this invention is provided with an automatic control device, which is capable of registering a programme of shifts which is in accordance with the pattern desired, and of having this programme performed. The operation of this control device can, for instance, be based in a known way on the scanning of templets or on the following of lines by photo-electric means, or the device may be equipped with an electronic memory.

When using a ribbon knife or a ribbon saw, the angle position of the knife or the saw should always be adjusted in accordance with the direction of movement. This variability constitutes a complication in the operation of the cutting apparatus. For this reason, the apparatus is preferably equipped with a cutting wire or a wire saw, which can cut in all directions without the angle position needing to be adjusted. This cutting wire or wire saw is preferably constructed as endless and is guided over two guiding wheels mounted on the slides and over a number of guiding wheels mounted on the frame, so that the course run by the cutting wire does not change its length when the slides are shifted.

This invention is further described and elucidated hereinafter with the aid of a drawing showing a diagrammatical view of an embodiment of the cutting apparatus for the clothing industry.

Figure 1:
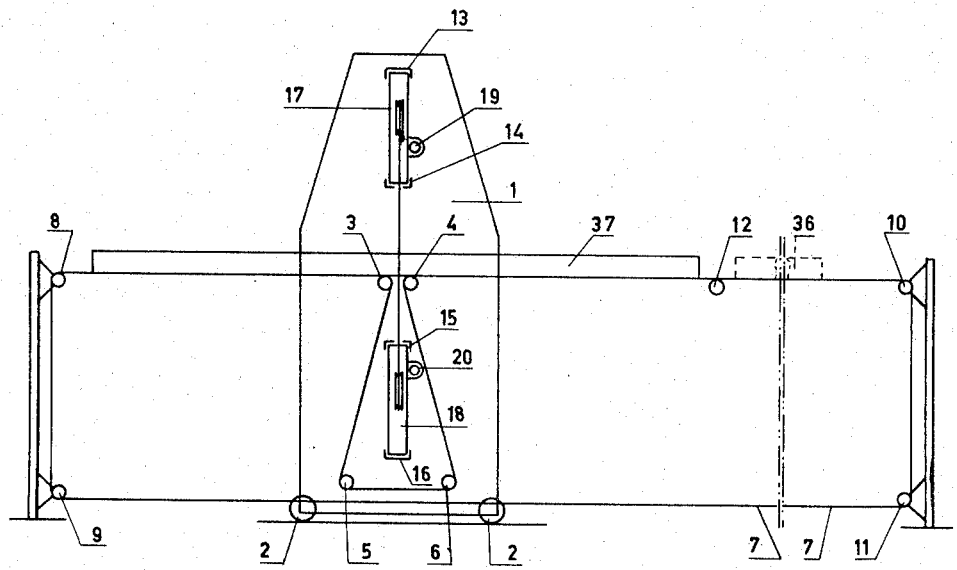
FIG. 1 is a front view of the apparatus.
Figure 2:
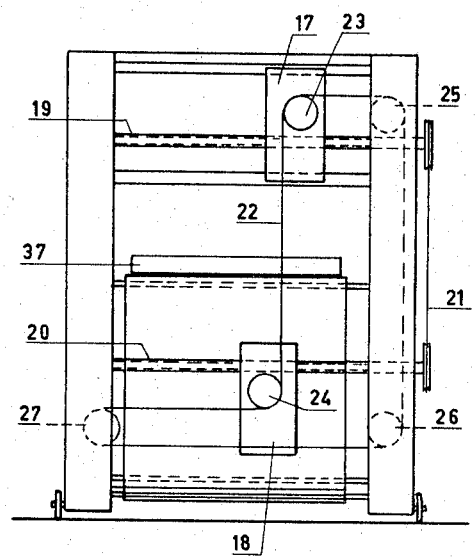
FIG. 2 is a cross-section through the apparatus according to the plane of the cutting wire.

The frame 1, which is shaped as a portal and which can ride on the wheels 2 on or along rails not shown in the drawing, is provided with two rollers 3 and 4 placed closely together, and with two rollers 5 and 6 placed under the former at a larger distance from one another.

The flexible endless band 7 is supported by the rollers 3, 5, 6 and 4 and further by the fixedly mounted rollers 12, 10, 11, 9 and 8. The width of the band 7 corresponds to the largest width of the textile packets to be cut.

The frame 1 carries the rails 13, 14, 15 and 16, which are parallel to the rollers, and along which the upper slide 17 and the lower slide 18 can glide. These are driven by the screw shafts 19 and 20 respectively, which are connected by the chain transmission 21. The screw shafts can be rotated by a motor not shown in the drawing. The endless wire saw 22 is guided over the wheels 23 and 24, which are provided on the upper and lower slides 17 and 18 respectively, and over the wheels 25, 26 and 27, which are mounted on the frame 1. The wire saw 22 can be driven by means of a motor, which is connected to the wheel 25.

The operation of the apparatus is as follows:

A supporting surface is formed by those parts of the band 7, which are situated between the rollers 8 and 3 and between the rollers 4 and 10, one half of the said supporting surface, i.e. the half extended between the rollers 12 and 10, being used for the preparation of the textile packet 36 which is still to be cut, and the other half, which is extended between the rollers 8 and 12, supporting the textile packet 37 while being cut.

After the textile packet 37 has been cut and removed, the next textile packet 36, which is lying on the right part of the supporting surface, is conveyed to the left half, the cutting-out table, by having the band 7 as a whole circulate anti-clockwise. For this purpose, one of the rollers 8, 9, 10 and 11 can be provided with a driving gear. During the cutting, the band 7 is fixed by blocking one of the before-mentioned rollers.

Subsequently, the wire saw 22, which is driven by the wheel 25, is made to move through the textile packet along the course desired.

Each movement of the saw can be obtained through a combination of a shift of the frame 1 and a shift of the slides 17 and 18, which two shifts form two coordinates of the desired saw movement which are perpendicular to each other.

A driving mechanism, which is not shown in the drawing, is used for shifting the frame 1, which mechanism can be of any known type, such as, for instance, a screw-shaft or a chain drive. The slides 17 and 18 are shifted by the screw shafts 19 and 20. Both shifts may be obtained by hand, if so required while having a servomotor connected between. The apparatus described, however, is meant in the first place as an automatic cutting system, in which the two coordinate movements of the saw are carried out according to a fixed programme with the aid of, for instance, means known from the technique of contour copying.

As at the location of the saw the supporting of the textile packet is insufficient, owing to the necessarily rather large diameter of the rollers 3 and 4, two extra supports 28 and 29 have been provided on the frame 1 in this place. These supports have an angle profile and their upper sides are polished in order to keep the friction as low as possible.

Further, there are provided in this place two pressers 30 and 31, which prevent the textile from being pushed away by the cutting forces and from laying itself in folds, which would prejudice the accuracy of the product.

The pressers 30 and 31 are fixed to the frame 1, so that they move together with the saw 22.

Figure 3:
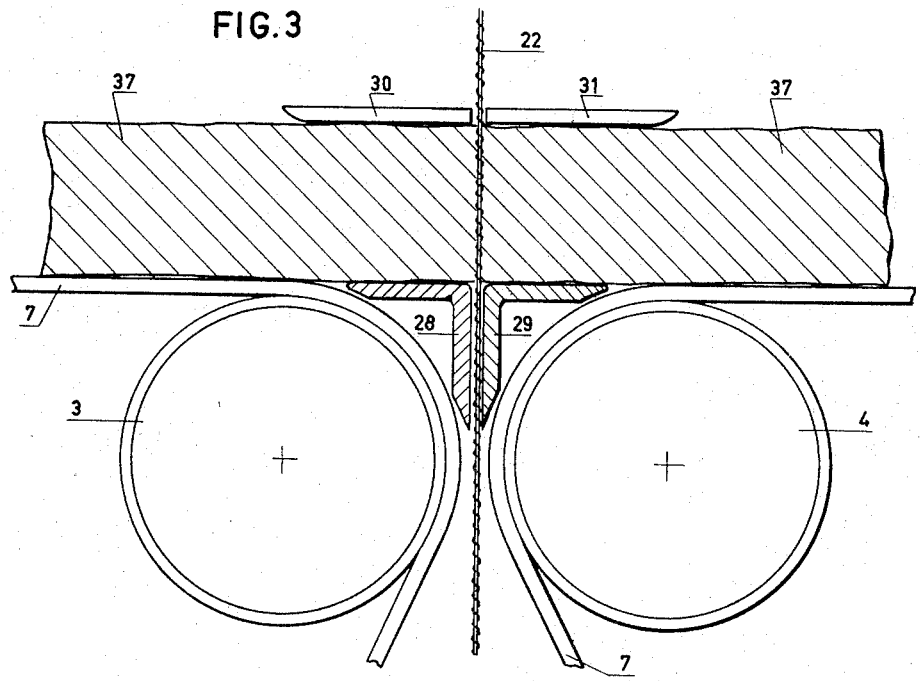
FIG. 3 is a detail of the cutting device.
Figure 4:
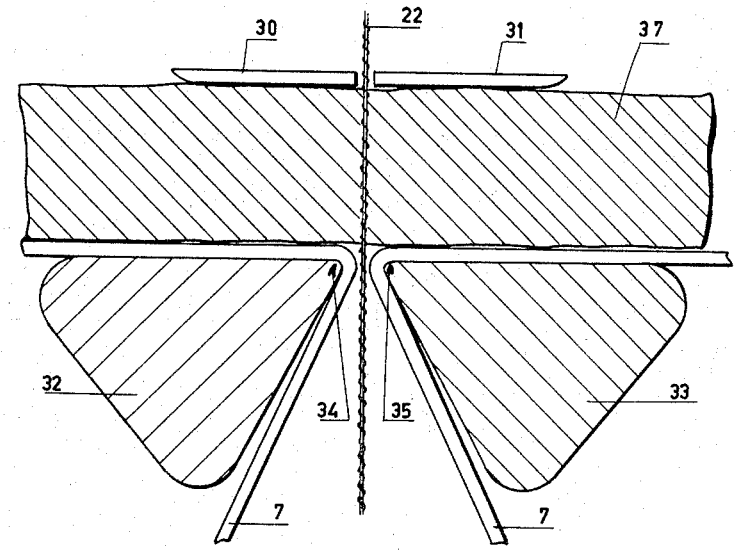
FIG. 4 is a different embodiment of the detail according to FIG. 3.

In another embodiment of the cutting device, of which FIG. 4 shows a detail, the rollers 3 and 4 are missing. Instead of these there are provided two deflection elements 32 and 33, over which the band 7 glides. By choosing material of a suitable composition for the band 7, it is possible to choose a radius for the edges 34 and 35 which is so small that the supports 28 and 29 of the embodiment shown in FIGURE 3 can be left out.

I claim:

1. Apparatus for cutting sheet material, especially the cutting of the constituent parts of articles of dress and the like from textile or such like flexible material, the said apparatus comprising a platform supporting surface for supporting the material to be cut and a cutting element which is substantially perpendicular to the supporting surface and which can be moved along its own axis, wherein the platform is formed by a flexible band, which is guided over two mutually parallel deflection elements, which are mounted close to one another on either side of the cutting element and over at least one deflection element mounted thereunder, the said cutting element being carried by slides movably mounted over and under the platform, which slides can be simultaneously subjected to like shifts parallel to the deflection elements by means of two operationally connected conveying mechanisms, the cutting element being an endless cutting wire which is guided over two guiding wheels mounted on the upper and lower slides and the course of which wire runs from the guiding wheels in opposite directions parallel to the direction in which the slides can be shifted and which course is closed by means of guiding wheels mounted on the frame the said deflection element being carried by a frame, which can be moved perpendicularly to the longitudinal direction of the deflection elements, which frame also carries the cutting element and the said slides and the said guide wheels on which the cutting element is mounted.

2. Apparatus according to claim 1, wherein the cutting element is a wire which cuts in all directions in planes perpendicular to its axis.

3. Apparatus according to claim 1, wherein the ends of the band which form the supporting surface are connected to fixed points.

4. Apparatus according to claim 1, wherein the flexible band is an endless one and is guided from each end of the supporting surface over fixedly mounted deflection elements to the other end of the supporting surface.

5. Apparatus for cutting sheet material or the like comprising: an elongated platform formed of flexible material for supporting the sheet material to be cut, a frame member movable longitudinally of said platform and having connected thereto two parallel deflection elements mounted close together and extending transversely across the platform, at least one additional deflecting element below the platform, whereby the flexible platform material extends over and between the first two deflecting elements downwardly and under the said additional deflecting element to form a recess in the form of a slot, the slot being movable longitudinally of the platform as the deflecting elements move longitudinally of the platform with the frame member, an endless cutting element movable along its own axis to perform a cutting action, a portion of the cutting element extending substantially perpendicular to the platform through the said recess, the said cutting element being supportedly mounted on guide members connection to the frame including a first guide member mounted above the platform and a second guide member mounted below the platform in the said recess, and including means for moving the said guide members transversely of the platform thereby moving the said perpendicular portion of the endless cutter element transversely of the platform independently of the movement of the frame longitudinally of the platform.

6. An apparatus as claimed in claim 5 wherein the said means for moving the guide members comprises horizontal shafts connected to the frame member and mounted above and below the platform respectively, a guide wheel mounted for sliding movement along each said shaft, the said perpendicular portion of the endless cutter extending between the said guide wheels, and additional guide elements mounted on said frame and arranged to keep the said portion of the cutting element substantially perpendicular to the plane of the platform irregardless of the transverse position of the said portion of the cutting element with respect to the platform.

7. An apparatus as claimed in claim 6 wherein the additional guide elements include a first and a second additional guide element mounted on the frame on one side of the platform and a third additional guide element mounted on the frame on the other side of the platform, whereby the cutting element extends from one guide wheel to the said one side of the platform where it is supported by the first and second additional guide elements, the said cutting element crossing the plane of the platform between the said guide elements, and the said cutting element extending from the other guide wheel to the said other side of the platform to the said third guide element.

References Cited

UNITED STATES PATENTS

| | | | |
|---|---|---|---|
| 123,265 | 1/1872 | Laemmel | 83—201.15 X |
| 1,172,058 | 2/1916 | Scheyer | 83—71 |
| 2,682,307 | 6/1954 | Overman | 83—318 |
| 2,782,853 | 2/1957 | Heffelfinger | 83—350 X |
| 3,072,004 | 1/1963 | Jenkins | 83—318 |
| 3,245,295 | 4/1966 | Mueller | 83—56 |

FOREIGN PATENTS 583,876 10/1958 Italy.

WILLIAM W. DYER, Jr., *Primary Examiner.*

JAMES M. MEISTER, *Examiner.*